(12) United States Patent
Harel et al.

(10) Patent No.: US 12,554,647 B1
(45) Date of Patent: Feb. 17, 2026

(54) REMOTE MEMORY CACHE REPLACEMENT

(71) Applicant: Mellanox Technologies, Ltd., Yokneam (IL)

(72) Inventors: Guy Harel, Haifa (IL); Yaniv Strassberg, Yokneam Illit (IL); Liran Liss, Atzmon-Segev (IL); Yuval Itkin, Zoran (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

(21) Appl. No.: 18/903,011

(22) Filed: Oct. 1, 2024

(51) Int. Cl.
G06F 12/08 (2016.01)
G06F 12/0862 (2016.01)
G06F 12/126 (2016.01)
G06F 15/173 (2006.01)

(52) U.S. Cl.
CPC ........ G06F 12/0862 (2013.01); G06F 12/126 (2013.01); G06F 15/17331 (2013.01)

(58) Field of Classification Search
CPC .... G06F 12/08; G06F 12/0862; G06F 12/126; G06F 12/12; G06F 15/17331; G06F 15/173; G06F 12/10; G06F 12/0838
See application file for complete search history.

(56) References Cited

U.S. PATENT DOCUMENTS

| | | | | |
|---|---|---|---|---|
| 12,388,825 | B2 * | 8/2025 | Sinha | H04L 63/10 |
| 2002/0194313 | A1 * | 12/2002 | Brannock | G06F 8/65 |
| | | | | 717/176 |
| 2003/0009623 | A1 * | 1/2003 | Arimilli | G06F 12/0813 |
| | | | | 711/119 |
| 2006/0123405 | A1 * | 6/2006 | O'Brien | G06F 8/4442 |
| | | | | 717/150 |
| 2007/0260821 | A1 * | 11/2007 | Zeffer | G06F 12/0815 |
| | | | | 711/143 |
| 2007/0283098 | A1 * | 12/2007 | O'Brien | G06F 9/30047 |
| | | | | 711/E12.051 |
| 2016/0335062 | A1 * | 11/2016 | Teodorescu | G06F 3/067 |

(Continued)

FOREIGN PATENT DOCUMENTS

EP    3663913 A1 *  6/2020  ........... G06F 9/4416

OTHER PUBLICATIONS

S. Kannan, A. Gavrilovska, K. Schwan and D. Milojicic, "Optimizing Checkpoints Using NVM as Virtual Memory," 2013 IEEE 27th International Symposium on Parallel and Distributed Processing, Cambridge, MA, USA, 2013, pp. 29-40.*

(Continued)

Primary Examiner — Pierre Michel Bataille
(74) Attorney, Agent, or Firm — Meitar Patents Ltd.; Daniel Kligler

(57) ABSTRACT

In one embodiment, a network device includes a network interface to share data over a network, a cache memory to store software code units of software code, fetcher circuitry to fetch the software code units for loading into the cache memory, and a processing unit to check for a given software code unit in the cache memory resulting in a cache miss, wherein the fetcher circuitry is to receive the given software code unit over the network from a remote memory disposed in a remote device as part of a cache replacement process, and provide the given software code unit to the cache memory.

20 Claims, 5 Drawing Sheets

(56) References Cited

U.S. PATENT DOCUMENTS

| | | | |
|---|---|---|---|
| 2019/0108347 A1* | 4/2019 | Ghetie | G06F 9/4418 |
| 2025/0165178 A1* | 5/2025 | Gao | G06F 8/65 |

OTHER PUBLICATIONS

J. Xue, R. Chen and Z. Shao, "SoftSSD: Software-defined SSD Development Platform for Rapid Flash Firmware Prototyping," 2022 IEEE 40th International Conference on Computer Design (ICCD), Olympic Valley, CA, USA, 2022, pp. 602-609.*

* cited by examiner

REMOTE MEMORY CACHE REPLACEMENT

FIELD OF THE DISCLOSURE

The present disclosure relates to computer systems, and in particular, but not exclusively to, cache replacement.

BACKGROUND

A device including a chip with a processor to run firmware (FW) may have enough memory to contain the whole FW image on chip. The processor may then load the FW from the chip, authenticate the FW, and run the FW. This is the easiest solution software-wise, but is the least cost-effective method due to cost of the large memory needed to store the whole FW image on chip.

To address this challenge central processor units (CPUs) or other processors have a cache into which code is loaded from an off-chip memory, e.g., DRAM, as needed. When the processor needs to read or write a location in memory, it first checks for a corresponding entry in the cache. The cache checks for the requested memory location in any cache lines that might contain that address. If the processor finds that the memory location is in the cache, a cache hit has occurred. However, if the processor does not find the memory location in the cache, a cache miss has occurred. In the case of a cache hit, the processor reads or writes the data in the cache line. For a cache miss, the cache allocates a new entry, copies data from main memory (e.g., DRAM) into the new entry, and the request is fulfilled from the contents of the new entry of the cache.

SUMMARY

There is provided in accordance with an embodiment of the present disclosure, a network device, including a network interface to share data over a network, a cache memory to store software code units of software code, fetcher circuitry to fetch the software code units for loading into the cache memory, and a processing unit to check for a given software code unit in the cache memory resulting in a cache miss, wherein the fetcher circuitry is to receive the given software code unit over the network from a remote memory disposed in a remote device as part of a cache replacement process, and provide the given software code unit to the cache memory.

Further in accordance with an embodiment of the present disclosure the cache memory is to call the fetcher circuitry to retrieve the given software code unit as part of the cache replacement process, the fetcher circuitry is to generate a request for the given software code unit from the remote memory disposed in the remote device, the network interface is to provide the request to the remote device over the network and receive the given software code unit from the remote device over the network, the fetcher circuitry is to receive the given software code unit and provide the given software code unit to the cache memory, the cache memory is to store the given software code unit, and the processor unit is to receive the given software code unit from the cache memory and execute the given software code unit.

Still further in accordance with an embodiment of the present disclosure the fetcher circuitry is to generate a remote direct memory access request for the given software code unit, provide the remote direct memory access request to the remote device over the network, and receive a remote direct memory access response including the given software code unit from the remote device over the network.

Additionally in accordance with an embodiment of the present disclosure, the device includes a non-volatile memory (NVM) controller to read the software code from a local NVM as part of a boot process, and provide the software code to the processing unit, wherein the processing unit is to provide the software code to the remote device for writing on the remote memory as part of the boot process.

Moreover, in accordance with an embodiment of the present disclosure the processing unit is to write the software code on the remote memory using at least one remote direct memory access write as part of the boot process.

Further in accordance with an embodiment of the present disclosure, the device includes a non-volatile memory (NVM) controller to retrieve data from a local NVM, the local NVM storing the software code, wherein the fetcher circuitry is to retrieve the given software code unit from the remote memory instead of from the local NVM.

Still further in accordance with an embodiment of the present disclosure the fetcher circuitry is to generate a first request for another software code unit from the remote memory disposed in the remote device, and the fetcher circuitry is to generate a second request to the NVM controller to retrieve the other software code unit from the local NVM.

Additionally in accordance with an embodiment of the present disclosure the NVM controller is to retrieve the other software code unit from the local NVM and provide the other software code unit to the fetcher circuitry, the fetcher circuitry is to receive the other software code unit and provide the other software code unit to the cache memory, the cache memory is to store the other software code unit, and the processor unit is to receive the other software code unit from the cache memory and execute the other software code unit.

Moreover, in accordance with an embodiment of the present disclosure the fetcher circuitry is to provide the first request to the remote device, and after failure to retrieve the other software code unit from the remote memory in response to the first request, provide the second request to the NVM controller.

Further in accordance with an embodiment of the present disclosure the fetcher circuitry is to determine the failure of the first request based on at least one configured policy, the at least one configured policy including one or more of the following a maximum number of retries to receive the other software code unit in response to the first request, a timeout to wait to receive the other software code unit in response to the first request, identification of a network problem, identification of a problem with the remote device, and identification of errors in the other software code unit received from the remote memory.

Additionally in accordance with an embodiment of the present disclosure the fetcher circuitry is to execute fetcher software code, which is only cached replaced from the local NVM.

Still further in accordance with an embodiment of the present disclosure the network device is a network switch.

Additionally in accordance with an embodiment of the present disclosure the remote memory is dynamic random-access memory (DRAM).

Moreover, in accordance with an embodiment of the present disclosure the fetcher circuitry is to receive packets including the given software code unit out-of-order.

Further in accordance with an embodiment of the present disclosure the given software code unit is an authenticatable unit of software code, the fetcher circuitry being to authenticate the given software code unit after all of the packets of a given request are received from the remote memory.

Still further in accordance with an embodiment of the present disclosure the fetcher circuitry is to receive the given software code unit from the remote memory via a non-reliable connection of the network.

Additionally in accordance with an embodiment of the present disclosure, the device includes read-only memory (ROM), which includes boot management and recovery routines.

Moreover, in accordance with an embodiment of the present disclosure the fetcher circuitry is to restrict receipt of the given software code unit to at least one of a given network, or a given port connection of the remote device.

Further in accordance with an embodiment of the present disclosure the fetcher circuitry is to receive the given software code unit in an encrypted form from the remote device.

Still further in accordance with an embodiment of the present disclosure the fetcher circuitry is to receive the given software code unit in a non-encrypted form from the remote device, and authenticate the given software code unit prior to execution of the given software code unit.

Additionally in accordance with an embodiment of the present disclosure the fetcher circuitry is to attempt to retrieve another software code unit over the network from multiple remote memories on multiple corresponding remote devices as part of the cache replacement process.

There is also provided in accordance with another embodiment of the present disclosure, a method, including fetching software code units of software code for loading into a cache memory, checking for a given software code unit in the cache memory resulting in a cache miss, receiving the given software code unit over a network from a remote memory disposed in a remote device as part of a cache replacement process, and providing the given software code unit to the cache memory.

BRIEF DESCRIPTION OF THE DRAWINGS

The present disclosure will be understood from the following detailed description, taken in conjunction with the drawings in which.

DESCRIPTION OF EXAMPLE EMBODIMENTS

Overview

Figure 1:
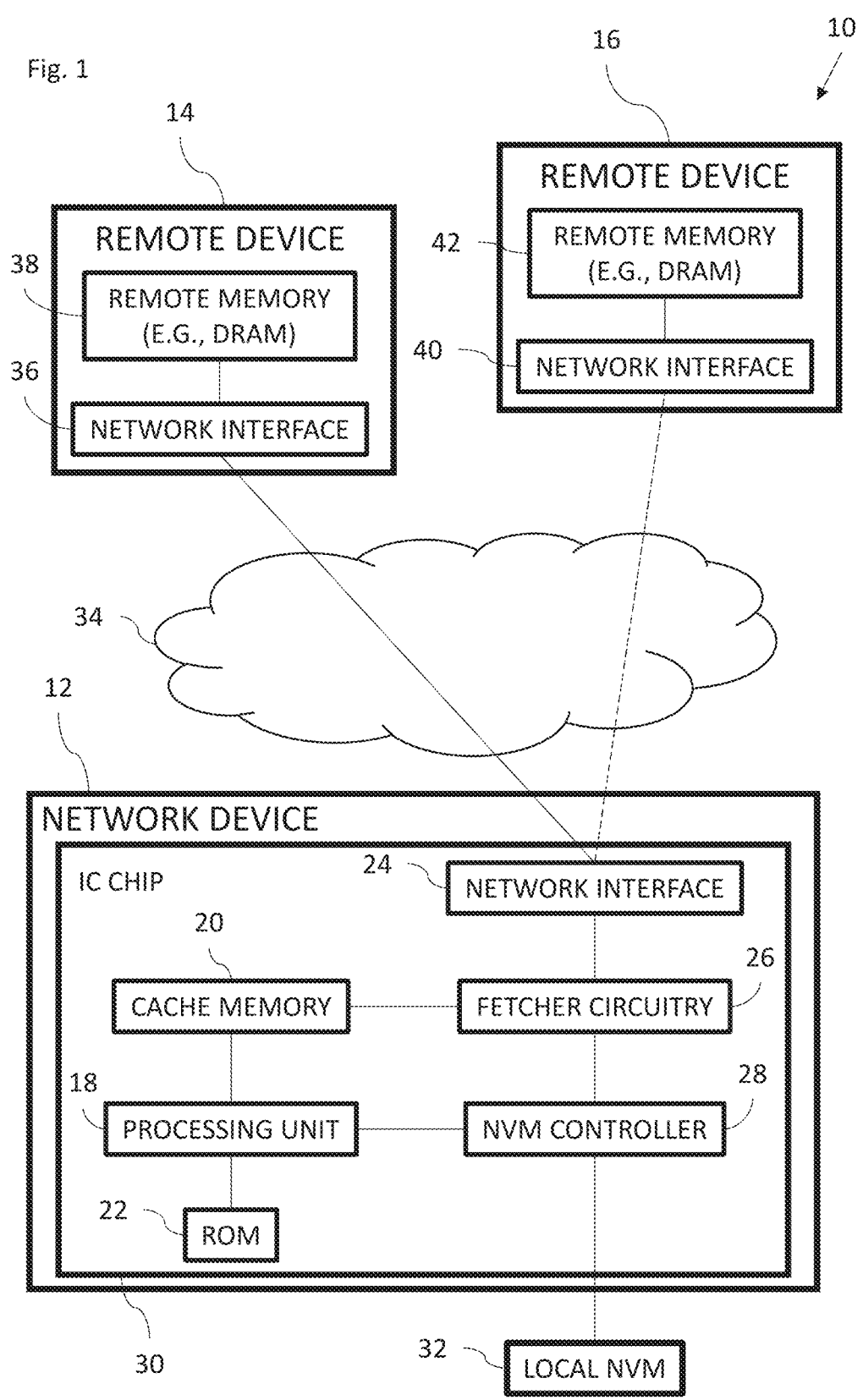
FIG. 1 is a block diagram view of a cache replacement system constructed and operative in accordance with an embodiment of the present disclosure.

As previously mentioned, a device running firmware ideally has enough on-chip memory to store the whole firmware image. However, this may not be possible, mainly due to cost.

One solution is to use off-chip memory such as DRAM, e.g., in a connected host device. A host device may share memory (e.g., DRAM) with a particular device, e.g., a network interface controller (NIC). The host device may provide some host memory to be used by the NIC, e.g., to upload FW code to the host memory from non-volatile memory (NVM) (e.g., flash drive), and then the NIC retrieves FW code units as needed. The reason to do this rather than using flash memory directly is that accessing DRAM on the host device is much faster than accessing flash memory attached to the NIC. Accessing flash memory may be an order of magnitude, or two, slower than accessing DRAM memory.

In some cases, such as with a network switch, local DRAM may not be available to the device running the FW, so that NVM may need to be used to store the firmware image, and the device loads the FW from the NVM resulting in slow access to the FW.

Therefore, embodiments of the present disclosure address at least some of the above drawbacks by providing a network device, which accesses units of software code (e.g., firmware) from a remote memory (e.g., DRAM) over a network, e.g., using remote direct memory access (RDMA). Accessing the units of software from the remote memory over the network may be much faster than accessing the units of software from a local NVM even connected to the network device by a non-network connection.

In some embodiments, the network device may be a network switch with a fast fabric with hundreds of Gigabits on each port. The network device may use its network interface, which is hundreds of times faster than flash memory, in order to access a remote memory (e.g., DRAM) which is allocated by a CPU in a remote device in order to fetch, at runtime, missing piece(s) of code into its cache and authenticate the received code and run the received code.

In some cases, a requested software unit may not arrive (e.g., due to network problems or problems on the remote device), may arrive with errors from the remote device, may arrive out of order, or may arrive after a delay. Therefore, in some embodiments, the network device may request the software unit from a local NVM after failure to receive the software unit from the remote memory. Requesting the software unit from the local NVM may be performed in addition to, or instead of, re-requesting the software unit from the remote device. In some embodiments, the software unit may be requested from another remote memory after failure to receive the software unit from the original remote memory.

In some embodiments, a policy is established to define "failure" of receiving a software unit and how to proceed when failure is detected. A failure may be defined with respect to a given number of tries and/or a timeout. Failure may lead to requesting the software unit from the local NVM, and/or re-requesting the software unit from the original remote memory, and/or requesting the software unit from another remote memory. In some embodiments, if a network error is detected, or if an error is detected with the remote device or remote memory, the network device may default to requesting software units from the local NVM until the error is resolved.

In some embodiments, upon boot of the network device, software code stored in the local NVM is copied by the network device to the remote memory (e.g., using RDMA). The boot process may also include configuring the network device to act according to the determined "failure" policy. In runtime, if a processing unit of the network device needs a given unit of software code, the processing unit verifies if that given software code unit is in cache memory of the network device. If the given software code unit is in the cache memory, the processing unit reads the given software code unit from the cache memory. If the given unit of software code is not in the cache memory, there is a cache miss, and fetcher circuitry is called to retrieve the given unit of software code. The fetcher logic initiates a process to retrieve the given software code unit from the remote memory, e.g., using an RDMA request. If there is a failure in retrieving the given software code unit, such as the remote memory on the remote device becoming unavailable due to some event (e.g., the remote system goes down, there is a network problem or delay), the fetcher circuitry identifies the failure (explicitly or implicitly) and instead of waiting until the remote memory is available, the fetcher circuitry fetches the given software code unit from the local non-volatile memory of the network device via a local non-volatile memory controller, and the fetcher logic loads the retrieved given software code unit into the cache memory.

System Description

Reference is now made to FIG. 1, which is a block diagram view of a cache replacement system 10 constructed and operative in accordance with an embodiment of the present disclosure. The system 10 includes a network device 12 and a remote device 14. In some embodiments, system 10 includes one or more other remote devices 16.

The network device 12 includes a processing unit 18, a cache memory 20, a read only memory (ROM) 22, a network interface 24, fetcher circuitry 26, and a non-volatile memory (NVM) controller 28. The network device 12 also includes an integrated circuit chip 30, for example an application-specific integrated circuit (ASIC) chip such as a network switch ASIC. The network device 12 may be any suitable network device such as a network switch or a network interface controller (NIC).

The processing unit 18 is configured to execute software code, e.g., firmware code. The processing unit 18 may be any suitable processing unit such as a central processing unit (CPU). The processing unit 18 is described in more detail with reference to FIGS. 2-4.

In practice, some or all of the functions of processing unit 18 may be combined in a single physical component or, alternatively, implemented using multiple physical components. These physical components may comprise hard-wired or programmable devices, or a combination of the two. In some embodiments, at least some of the functions of the processing unit 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The cache memory 20 is configured to store software code units (SWCUs) of software code according to a cache policy, described in more detail with reference to FIGS. 2 and 4. The cache memory 20 includes cache lines (not shown) that represent an arbitrary location on the software code space.

The ROM 22 is a non-volatile memory which is hard-coded on network device 12 and includes boot management and recovery routines, for example, to support recovery of a local non-volatile memory (NVM) 32, e.g., flash memory, if the local NVM 32 becomes corrupted. The network interface 24 is configured to share data over a network 34 with the remote device 14 and remote device(s) 16.

The fetcher circuitry 26 is configured to fetch SWCUs for loading into the cache memory 20. In some embodiments, the fetcher circuitry 26 is configured to execute fetcher software code (not shown) to provide at least some of the functionality of the fetcher circuitry 26. The fetcher software code is generally cache-replaced from the local NVM 32 and not from a remote memory because cache-replacement from the remote device 14 may result in a deadlock. The fetcher software code may be configured to implement remote direct memory access (RDMA) functionality such as generating RDMA reads and writes and processing RDMA responses. In other embodiments, the fetcher circuitry 26 may be implemented using firmware running on a suitable processor, or the fetcher circuitry 26 may be implemented in hardware.

In practice, some or all of the functions of fetcher circuitry 26 may be combined in a single physical component or, alternatively, implemented using multiple physical components. These physical components may comprise hard-wired or programmable devices, or a combination of the two. In some embodiments, at least some of the functions of the fetcher circuitry 26 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The NVM controller 28 is configured to retrieve data (such as software code) from local NVM 32, which is configured to store the software code.

The remote device 14 includes a network interface 36 and a remote memory 38. Similarly, each remote device 16 includes a network interface 40 and a remote memory 42. Each remote device 14, 16 generally includes a processor such as a CPU and/or graphics processing unit (GPU). The remote device 14 may be, may include, or may be included in, a network switch or a host device. The remote memory 38, 42 may be any suitable memory such as dynamic random-access memory (DRAM). The network interface 36, 40 is configured to share data over the network 34 with network device 12.

In some embodiments, there may be multiple copies of the software code image stored remotely to network device 12 over the network such as stored in remote memory 38 and/or remote memory 42. The software code images are generally copied to remote memory 38 and/or remote memory 42 from local NVM 32 by the processing unit 18 as part of a boot process, described in more detail with reference to FIGS. 2 and 3. Having multiple copies of the software code stored remotely to network device 12 allows the network device 12 to retrieve SWCUs from a different remote memory if one of the remote memories (or connections to one of the remote memories) fails.

Figure 2:
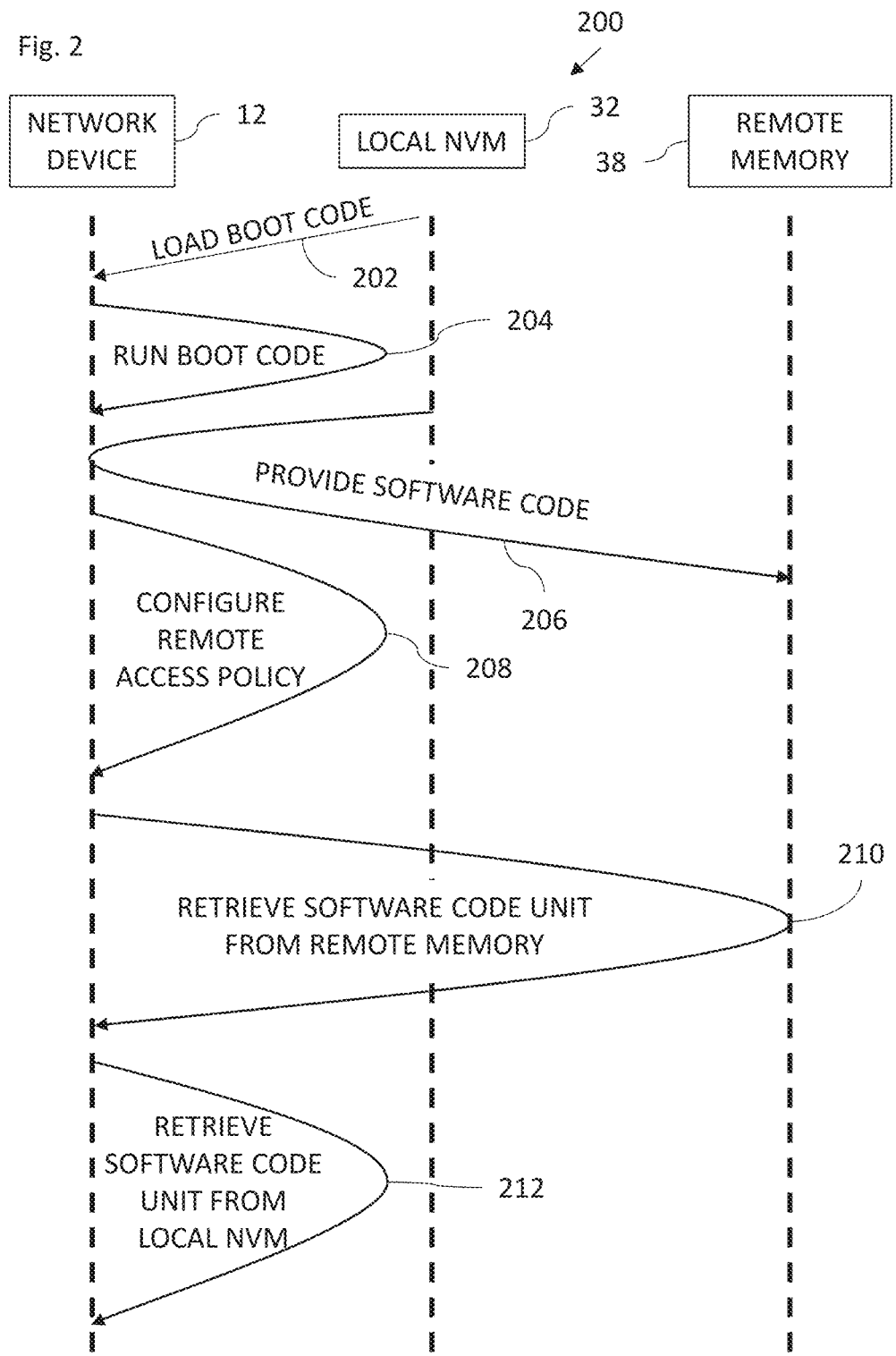
FIG. 2 is a dataflow diagram including dataflow in the system of FIG. 1.

Reference is now made to FIG. 2, which is a dataflow diagram 200 including dataflow in the system 10 of FIG. 1. Reference is also made to FIG. 1. The network device 12 loads boot code (arrow 202) from local NVM 32 and runs the boot code (arrow 204). The network device 12 loads software code from local NVM 32 and writes the software code to remote memory 38 (arrow 206). The network device 12 configures the remote access policy regarding when the fetcher circuitry 26 should default to retrieving a SWCU from the local NVM 32 instead of from the remote memory 38 (arrow 208). The remote access policy is described in more detail with reference to FIG. 4. In accordance with the remote access policy the fetcher circuitry 26 selectively retrieves SWCUs from remote memory 38 (arrow 210) and local NVM 32 (arrow 212).

Figure 3:
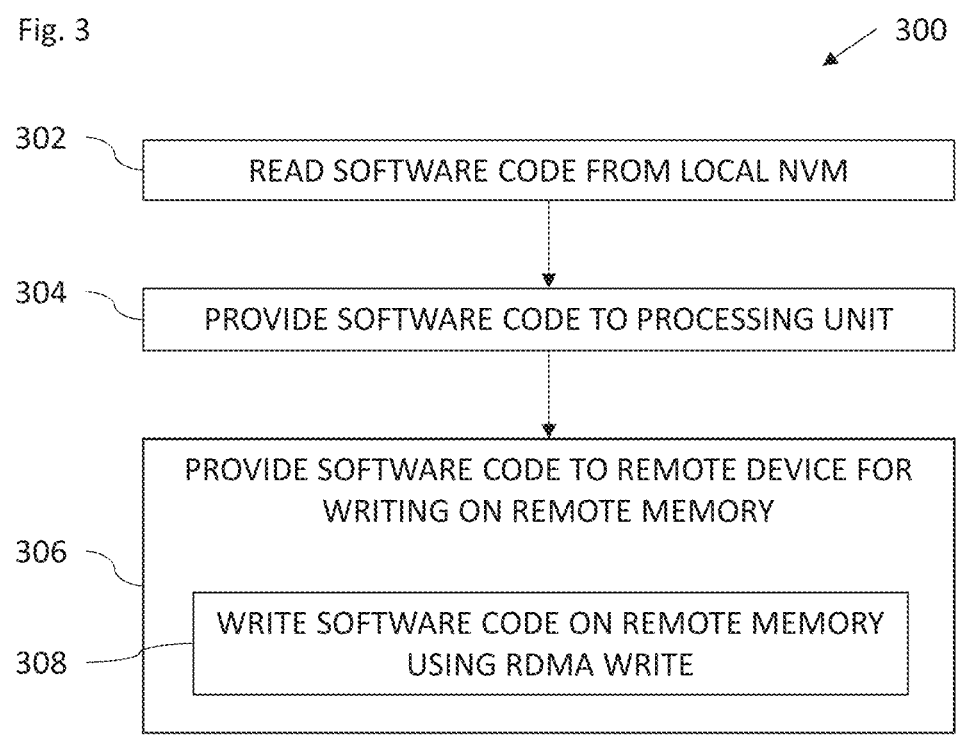
FIG. 3 is a flowchart including steps in a boot process of a network device in the system of FIG. 1.

Reference is now made to FIG. 3, which is a flowchart 300 including steps in a boot process of network device 12 in the system 10 of FIG. 1. The NVM controller 28 is configured to: read software code from local NVM 32 as part of a boot process (block 302); and provide the software code to the processing unit 18 (block 304). The processing unit 18 is configured to provide the software code to the remote device 14 for writing on the remote memory 38 as part of the boot process (block 306). In some embodiments, the processing unit 18 is configured to write the software code on the remote memory 38 using at least one RDMA write as part of the boot process (block 308).

Figure 4:
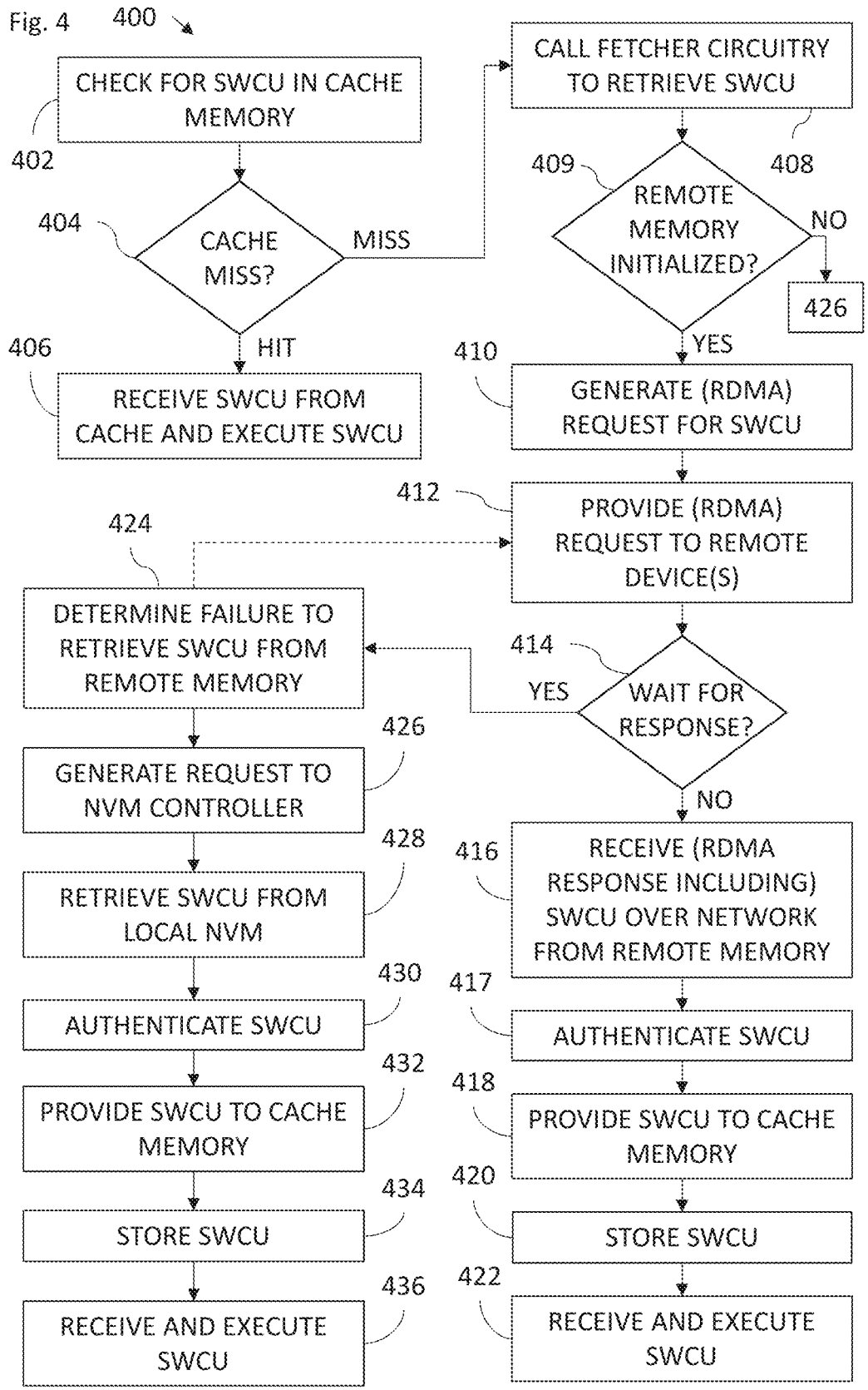
FIG. 4 is a flowchart including steps in a cache replacement method in the system of FIG. 1.

Reference is now made to FIG. 4, which is a flowchart 400 including steps in a cache replacement method in system 10 of FIG. 1. The processing unit 18 is configured to check for a given SWCU in the cache memory 20 (block 402). The given SWCU may be one or more computer instructions and/or an authenticable unit of code. At a decision block 404 it is determined whether the check for the given SWCU in the cache memory 20 results in a cache miss or a cache hit. If there is a cache hit, the processing unit 18 receives the given SWCU from the cache memory 20 and executes the SWCU (block 406). If there is a cache miss, the cache memory 20 is configured to call the fetcher circuitry 26 to retrieve the given SWCU as part of a cache replacement process (block 408). At a decision block 409, the fetcher circuitry 26 checks whether the remote memory 38 is initialized (i.e., whether all the software code has been loaded onto the remote memory 38). If all the software code is not loaded onto the remote memory 38, processing continues with the step of block 426 to load the SWCU from the local NVM 32. If all the software is loaded onto the remote memory 38, then the fetcher circuitry 26 is configured to generate a request to receive the given SWCU from the remote memory 38 disposed in the remote device 14 (block 410). In some embodiments, the fetcher circuitry 26 is configured to generate a remote direct memory access (RDMA) request, e.g., an RDMA read request, to receive the given SWCU. In some embodiments, the fetcher circuitry 26 is configured to restrict receipt of the given SWCU from the remote memory 38 to at least one of: a given network; or a given port connection of the remote device 14. The fetcher circuitry 26 is configured to provide the remote direct memory access request to the remote device 14 over the network 34 (block 412) via the network interface 24, which is configured to provide the request to the remote device 14 over the network 34.

In some embodiments, any suitable direct access method or even an indirect access method may be used instead of RDMA to retrieve the given SWCU. For example, the given SWCU may be received over a TCP connection or even over a non-reliable transportation protocol, e.g., UDP on special priority, where the fetcher circuitry 26 requests the CPU of the remote device 14 to provide the SWCU. If the SWCU does not arrive or arrives with errors, the SWCU may be re-requested and/or retrieved from the local NVM 32, as described in more detail below.

At a block 414, the fetcher circuitry 26 waits for a response from the remote memory 38. The following steps of blocks 416-422 assume that the given SWCU is received from the remote memory 38 without errors. The network interface 24 is configured to receive the given SWCU from remote memory 38 of the remote device 14 over the network 34 as part of the cache replacement process (block 416) and provide the given SWCU to the fetcher circuitry 26. In some embodiments, the fetcher circuitry 26 is configured to receive a remote direct memory access (RDMA) response including the given SWCU from the remote device 14 over the network 34 via network interface 24.

In some embodiments, the fetcher circuitry 26 is configured to authenticate the given SWCU (which is an authenticable unit of software code) prior to execution of the given SWCU (block 417). The fetcher circuitry 26 is configured to authenticate the given SWCU after all of the packets of the given software unit are received from the remote memory 38. If the authentication fails, the SWCU may be requested from a different source, such as local NVM 32 and/or a different remote memory 42.

The network 34 may be a private or public network. There could be one or multiple layers of encapsulation over the network 34 and the system 10 may utilize any suitable networking functionality such as redirection, virtualization, a logical network, isolation, any fabric type (InfiniBand, Ethernet) etc.

In some cases, the fetcher circuitry 26 may receive packets including the given SWCU in order or out-of-order. The fetcher circuitry 26 is configured to receive the given SWCU from the remote memory 38 via a reliable or a non-reliable connection of the network 34. In the above manner, the fetcher circuitry 26 is configured to retrieve the given SWCU from the remote memory 38 instead of from the local NVM 32. It should be noted that although the received SWCU may be received out-of-order, the received SWCU cannot be authenticated until all the packets of an authenticatable unit are received.

The fetcher circuitry 26 is configured to provide the given SWCU to the cache memory 20 (block 418). In some embodiments, the fetcher circuitry 26 is configured to receive the given SWCU in an encrypted form from the remote device 14. In other embodiments, the fetcher circuitry 26 is configured to receive the given SWCU in a non-encrypted form from the remote device 14.

The cache memory 20 is configured to store the given SWCU (block 420). The processing unit 18 is configured to receive the given SWCU from the cache memory 20 and execute the given SWCU (block 422).

As previously mentioned, at block 414 the fetcher circuitry 26 waits for the response from remote device 14. If the remote device 14 does not provide the SWCU within a given timeout and/or a given number of retries, or if the SWCU is received with errors, or if a network error is detected or another error is detected, the fetcher circuitry 26 is configured to determine failure of the request generated in the step of block 410 (block 424). Upon determining failure, the fetcher circuitry 26 may re-request the SWCU from remote device 14 and/or request the SWCU from local NVM 32 and/or request the SWCU from remote memory/memories 42 of one or more other remote devices 16, as described in more detail below.

In some embodiments, the fetcher circuitry 26 is configured to determine the failure of the request (generated in the step of block 410) based on at least one configured policy (e.g., remote access policy). The configured policy/policies may include one or more of the following: a maximum number of retries to receive the SWCU in response to the request; a timeout to wait to receive the SWCU in response to the request; identification of a network problem; identification of a problem with the remote device 14; and identification of errors in the SWCU received from the remote memory 38.

The description with reference to the steps of blocks 426-436 describes retrieving the SWCU from local NVM 32. The fetcher circuitry 26 is configured to generate a second request to the NVM controller 28 to retrieve the SWCU from the local NVM 32 (block 426) and provide the second request to NVM controller 28. The NVM controller 28 is configured to receive the second request and retrieve the SWCU from the local NVM 32 (block 428) and provide the SWCU to the fetcher circuitry 26. The fetcher circuitry 26 is configured to receive the SWCU and optionally authenticate the SWCU (block 430). If the authentication fails, the network device 12 may enter an error-recovery state which cannot be automatically recovered from. The fetcher circuitry 26 is configured to provide the (authenticated) SWCU to the cache memory 20 (block 432). The cache memory 20 is configured to receive the SWCU and store the SWCU in the cache memory 20 (block 434). The processing unit 18 is configured to receive the SWCU from the cache memory 20, and execute the SWCU (block 436).

In the scenario described above, the fetcher circuitry 26 is configured to provide the initial request (generated in the step of block 410) to the remote device 14 and then provide the second request to the NVM controller 28 to retrieve the SWCU from local NVM 32, after failure to retrieve the SWCU from the remote memory 14 in response to the initial request for the SWCU.

In some embodiments, after failure to retrieve the SWCU from the remote memory 38 in response to the initial request for the SWCU, the fetcher circuitry 26 is configured to provide a third request to the remote device 14 (and/or remote device(s) 16) to retrieve the SWCU from remote memory 38 (and/or remote memory/memories 42) and provide the second request to the NVM controller 28 to retrieve the SWCU from local NVM 32. The second and third request may be provided to the NVM controller 28 and remote device 14 (and/or remote device(s) 16), without waiting for a response to the third or the second request, respectively.

In some embodiments, the fetcher circuitry 26 is configured to attempt to retrieve one or more SWCUs over the network 34 from multiple remote memories 42 in multiple corresponding remote devices 16 as part of the cache replacement process. The attempt(s) to retrieve the SWCU (s) from multiple remote memories 42 may be performed as part of the initial request or when a subsequent request is sent following failure of the initial request to remote device 14. The requests to the remote devices 16 may be sent instead of, or in addition to, the request to the NVM controller 28.

Some, or all, of the functions performed by remote device 14 may be performed by one or more graphics processing units (GPUs).

Figure 5:
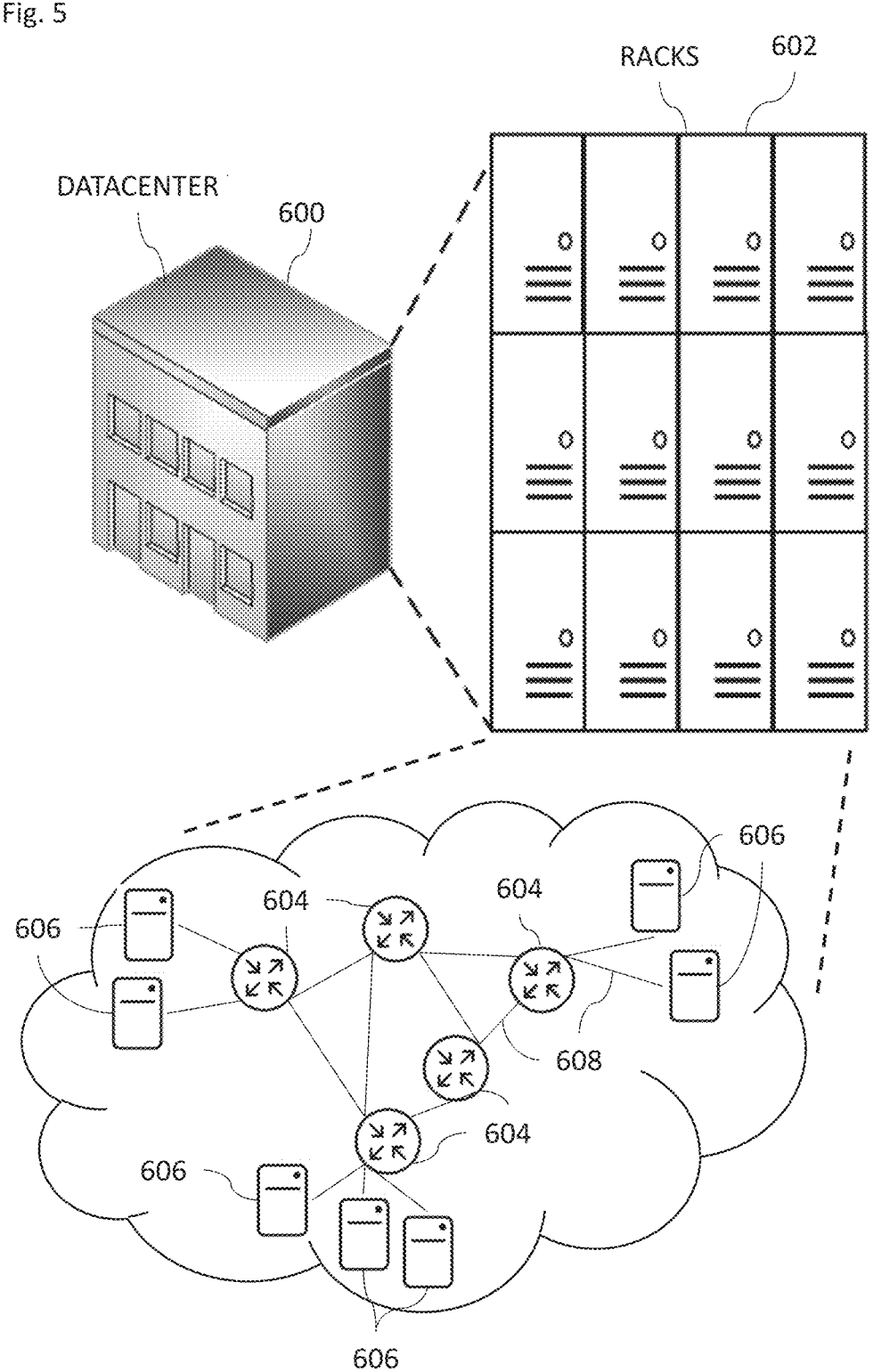
FIG. 5 is a schematic view of a datacenter in the system of FIG. 1 constructed and operative in accordance with an embodiment of the present disclosure.

Reference is now made to FIG. 5, which is a schematic view of a datacenter 600 in the system 10 of FIG. 1 constructed and operative in accordance with an embodiment of the present disclosure. The device(s) 12, 14 of FIG. 1 may be disposed in any suitable environment, such as datacenter 600. Datacenter 600 may include racks 602, which may include devices 12, 14 such as network switches 604, and end-host devices 606, for example. The datacenter 600 may also include cooling systems, power supply, network components such as NICs (of end-host devices 606) and cabling 608 (only some labelled) to provide high-speed connectivity e.g., with multiple internet providers for redundancy, physical and cyber protections, including access controls and surveillance, organized spaces for servers and equipment. The data center may support remote storage and computing for cloud services.

The NIC may include any of the following: an Ethernet Port (for example using an RJ45 Connector), which is the physical interface where the network cable (usually an Ethernet cable) connects to the NIC and is used for wired network connections; packet processing hardware or circuitry, which is responsible for handling network communication and processes incoming and outgoing data packets and manages the network interface functions; a memory (such as RAM or ROM) to store temporary data, such as network packet buffers, configuration settings, and firmware, and helps in speeding up data transfer and processing; firmware, which is software programmed into the NIC's memory and controls the hardware operations and may perform firmware updates to improve performance or add new features to the NIC; LED Indicators that provide visual indicators of network status, common indicators including power status, network activity, and link speed; a bus Interface (e.g., PCI or PCIe) to connect the NIC to the host computer's motherboard; a processor to handle network processing tasks as well as other processing tasks to offload work from the main CPU of the host device and improve network performance; a heat sink or cooling mechanism (e.g., for high-performance NICs), especially those used in servers, to prevent overheating; power management circuitry to ensure the NIC receives the correct amount of power and manages power consumption efficiently; and/or connector pins and circuitry including internal connections and pathways that route signals between the NIC's components.

The packet processing hardware or circuitry is the central component of the NIC and handles network communications. It may include several key components that work together to manage and process network data, such as any one or more of the following: MAC (Media Access Control) Layer, which is responsible for handling the data link layer of the OSI model and manages how data packets are formatted, addressed, and transmitted over the network; MAC address register, which stores the unique hardware address (MAC address) of the NIC; a frame buffer that temporarily holds data frames as they are being processed; a PHY (Physical Layer) Interface that interfaces with the physical medium (such as Ethernet cables) and is responsible for the actual transmission and reception of data bits over the network; a transceiver that converts data between the digital signals used by the MAC layer and the analog signals used for transmission over the network medium; DMA (Direct Memory Access) Controller that manages data transfers between the NIC and the computer's memory without involving the CPU and helps to offload processing tasks from the CPU and improve data transfer efficiency; a packet Processing Engine that handles the encapsulation and decapsulation of network packets, and processes incoming and outgoing packets, managing tasks like error checking and packet filtering; buffer management, which includes memory areas for storing packets temporarily, such as transmit buffers to store packets that are being sent from the computer to the network, receive buffers to store packets received from the network before they are processed by the system; an interrupt controller that manages and generates interrupts to notify the CPU of events such as packet reception or transmission completion and helps in efficient handling of network events; a clock generator, which provides timing signals for the various components of the NIC to synchronize their operations; a power management unit to regulate power consumption and manages power-saving features of the NIC chip to improve energy efficiency; error handling and correction logic, which detects and corrects errors in data transmission and reception, and may include features for error-checking protocols like CRC (Cyclic Redundancy Check); configuration registers that store configuration settings and parameters that control the NIC's operation, such as speed settings, interrupt configurations, and buffer sizes; firmware/ROM that contains the embedded software that controls the NIC's operations and manages network protocols.

The network switch may include any of the following: ports where network cables connect; switching fabric that manages data transfer between ports; a MAC address table that stores device addresses and port information; a forwarding engine that directs data packets to the correct ports; buffer memory that temporarily holds data to manage traffic; a management processor that handles configuration and monitoring in managed switches; a power supply that provides electrical power; a cooling system that keeps the switch from overheating; firmware that controls the switch; LED Indicators that show status and activity; and networking modules (in modular switches) that allow for additional ports or features.

Regarding the graphics processing unit, graphics processing units (GPUs) are employed to generate three-dimensional (3D) graphics objects and two-dimensional (2D) graphics objects for a variety of applications, including feature films, computer games, virtual reality (VR) and augmented reality (AR) experiences, mechanical design, and/or the like. A modern GPU includes texture processing hardware to generate the surface appearance, referred to herein as the "surface texture," for 3D objects in a 3D graphics scene. The texture processing hardware applies the surface appearance to a 3D object by "wrapping" the appropriate surface texture around the 3D object. This process of generating and applying surface textures to 3D objects results in a highly realistic appearance for those 3D objects in the 3D graphics scene.

The texture processing hardware is configured to perform a variety of texture-related instructions, including texture operations and texture loads. The texture processing hardware generates accesses texture information by generating memory references, referred to herein as "queries," to a texture memory. The texture processing hardware retrieves surface texture information from the texture memory under varying circumstances, such as while rendering object surfaces in a 3D graphics scene for display on a display device, while rendering 2D graphics scene, or during compute operations.

Surface texture information includes texture elements (referred to herein as "texels") used to texture or shade object surfaces in a 3D graphics scene. The texture processing hardware and associated texture cache are optimized for efficient, high throughput read-only access to support the high demand for texture information during graphics rendering, with little or no support for write operations. Further, the texture processing hardware includes specialized functional units to perform various texture operations, such as level of detail (LOD) computation, texture sampling, and texture filtering.

In general, a texture operation involves querying multiple texels around a particular point of interest in 3D space, and then performing various filtering and interpolation operations to determine a final color at the point of interest. By contrast, a texture load typically queries a single texel, and returns that directly to the user application for further processing. Because filtering and interpolating operations typically involve querying four or more texels per processing thread, the texture processing hardware is conventionally built to accommodate generating multiple queries per thread. For example, the texture processing hardware could be built to accommodate up to four texture memory queries performed in a single memory cycle. In that manner, the texture processing hardware is able to query and receive most or all of the needed texture information in one memory cycle.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The implementation of the method and/or system of examples of the disclosure can involve performing or completing selected tasks manually, automatically, or a combination thereof. Moreover, according to actual instrumentation and equipment of examples of the method and/or system of the disclosure, several selected tasks could be implemented by hardware, by software or by firmware or by a combination thereof using an operating system or a cloud-based platform.

For example, hardware for performing selected tasks according to examples of the disclosure could be implemented as a chip or a circuit. As software, selected tasks according to examples of the disclosure could be implemented as a plurality of software instructions being executed by a computer using any suitable operating system. In an exemplary example of the disclosure, one or more tasks according to exemplary examples of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed examples of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various examples of computer-implemented methods are provided herein, some of which can be performed by various examples of apparatuses and systems described herein and some of which can be performed according to instructions stored in non-transitory computer-readable storage media described herein. Still, some examples of computer-implemented methods provided herein can be performed by other apparatuses or systems and can be performed according to instructions stored in computer-readable storage media other than that described herein, as will become apparent to those having skill in the art with reference to the examples described herein. Any reference to systems and computer-readable storage media with respect to the following computer-implemented methods is provided for explanatory purposes, and is not intended to limit any of such systems and any of such non-transitory computer-readable storage media with regard to examples of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various examples of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The descriptions of the various examples of the present disclosure have been presented for purposes of illustration, but are not intended to be exhaustive or limited to the examples disclosed. Many modifications and variations will be apparent to those of ordinary skill in the art without departing from the scope and spirit of the described examples.

As used herein, the singular form "a", "an" and "the" include plural references unless the context clearly dictates otherwise.

It is appreciated that certain features of the disclosure, which are, for clarity, described in the context of separate examples, may also be provided in combination in a single example. Conversely, various features of the disclosure, which are, for brevity, described in the context of a single example, may also be provided separately or in any suitable sub-combination or as suitable in any other described example of the disclosure. Certain features described in the context of various examples are not to be considered essential features of those examples, unless the example is inoperative without those elements.

The above-described processes including portions thereof can be performed by software, hardware and combinations thereof. These processes and portions thereof can be performed by computers, computer-type devices, workstations, cloud-based platforms, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these examples to practice without undue experimentation. The processes (methods) and systems have been described in a manner sufficient to enable persons of ordinary skill in the art to readily adapt other hardware and software as may be needed to reduce any of the examples to practice without undue experimentation and using conventional techniques.

Various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

The embodiments described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed is:

1. A method, comprising:
    fetching software code units of software code for loading into a cache memory;
    checking for a given software code unit in the cache memory resulting in a cache miss;
    receiving the given software code unit over a network from a remote memory disposed in a remote device as part of a cache replacement process; and
    providing the given software code unit to the cache memory;
    retrieving data from a local NVM, the local NVM storing the software code;
    retrieving the given software code unit from the remote memory instead of from the local NVM;
    generating a first request for another software code unit from the remote memory disposed in the remote device; and generating a second request to retrieve the other software code unit from the local NVM.

2. A network device, comprising:
a network interface to share data over a network;
a cache memory to store software code units of software code;
fetcher circuitry to fetch the software code units for loading into the cache memory;
a processing unit to check for a given software code unit in the cache memory resulting in a cache miss, wherein the fetcher circuitry is to:
receive the given software code unit over the network from a remote memory disposed in a remote device as part of a cache replacement process; and
provide the given software code unit to the cache memory; and
a non-volatile memory (NVM) controller to retrieve data from a local NVM, the local NVM storing the software code, wherein the fetcher circuitry is to retrieve the given software code unit from the remote memory instead of from the local NVM, and wherein:
the fetcher circuitry is to generate a first request for another software code unit from the remote memory disposed in the remote device; and
the fetcher circuitry is to generate a second request to the NVM controller to retrieve the other software code unit from the local NVM.

3. The device according to claim 2, wherein:
the cache memory is to call the fetcher circuitry to retrieve the given software code unit as part of the cache replacement process;
the fetcher circuitry is to generate a request for the given software code unit from the remote memory disposed in the remote device;
the network interface is to provide the request to the remote device over the network and receive the given software code unit from the remote device over the network;
the fetcher circuitry is to receive the given software code unit and provide the given software code unit to the cache memory;
the cache memory is to store the given software code unit; and
the processor unit is to receive the given software code unit from the cache memory and execute the given software code unit.

4. The device according to claim 2, wherein the fetcher circuitry is to:
generate a remote direct memory access request for the given software code unit;
provide the remote direct memory access request to the remote device over the network; and
receive a remote direct memory access response including the given software code unit from the remote device over the network.

5. The device according to claim 2, wherein the non-volatile memory (NVM) controller is to:
read the software code from the local NVM as part of a boot process; and
provide the software code to the processing unit, wherein the processing unit is to provide the software code to the remote device for writing on the remote memory as part of the boot process.

6. The device according to claim 5, wherein the processing unit is to write the software code on the remote memory using at least one remote direct memory access write as part of the boot process.

7. The device according to claim 2, wherein:
the NVM controller is to retrieve the other software code unit from the local NVM and provide the other software code unit to the fetcher circuitry;
the fetcher circuitry is to receive the other software code unit and provide the other software code unit to the cache memory;
the cache memory is to store the other software code unit; and
the processor unit is to receive the other software code unit from the cache memory and execute the other software code unit.

8. The device according to claim 2, wherein the fetcher circuitry is to provide the first request to the remote device, and after failure to retrieve the other software code unit from the remote memory in response to the first request, provide the second request to the NVM controller.

9. The device according to claim 8, wherein the fetcher circuitry is to determine the failure of the first request based on at least one configured policy, the at least one configured policy including one or more of the following: a maximum number of retries to receive the other software code unit in response to the first request; a timeout to wait to receive the other software code unit in response to the first request; identification of a network problem; identification of a problem with the remote device; and identification of errors in the other software code unit received from the remote memory.

10. The device according to claim 2, wherein the fetcher circuitry is to execute fetcher software code, which is only cached replaced from the local NVM.

11. The device according to claim 2, wherein the network device is a network switch.

12. The device according to claim 2, wherein the remote memory is dynamic random-access memory (DRAM).

13. The device according to claim 2, wherein the fetcher circuitry is to receive packets including the given software code unit out-of-order.

14. The device according to claim 13, wherein the given software code unit is an authenticatable unit of software code, the fetcher circuitry being to authenticate the given software code unit after all of the packets of a given request are received from the remote memory.

15. The device according to claim 2, wherein the fetcher circuitry is to receive the given software code unit from the remote memory via a non-reliable connection of the network.

16. The device according to claim 2, further comprising read-only memory (ROM), which includes boot management and recovery routines.

17. The device according to claim 2, wherein the fetcher circuitry is to restrict receipt of the given software code unit to at least one of: a given network; or a given port connection of the remote device.

18. The device according to claim 2, wherein the fetcher circuitry is to receive the given software code unit in an encrypted form from the remote device.

19. The device according to claim 2, wherein the fetcher circuitry is to: receive the given software code unit in a non-encrypted form from the remote device, and authenticate the given software code unit prior to execution of the given software code unit.

20. The device according to claim 2, wherein the fetcher circuitry is to attempt to retrieve another software code unit over the network from multiple remote memories on multiple corresponding remote devices as part of the cache replacement process.

\* \* \* \* \*